United States Patent [19]

Weidanz et al.

[11] 3,797,034

[45] Mar. 12, 1974

[54] DEVICE FOR SETTING THE TRACK OF RECORDS

[75] Inventors: Herbert Weidanz, Odenthal-Globusch; Gerhardt Sandt, Cologne, both of Germany

[73] Assignee: Datagraph A.G., Zug, Switzerland

[22] Filed: Sept. 29, 1972

[21] Appl. No.: 293,801

[30] Foreign Application Priority Data

Oct. 16, 1971 Germany .......................... 2151595

[52] U.S. Cl. ...................................360/88, 360/106

[51] Int. Cl. ........................................... G11b 5/48

[58] Field of Search ..................... 340/174.1 C, 1 R; 235/61.12 M

[56] References Cited

UNITED STATES PATENTS 3,145,268 8/1964 Whitney et al. ................ 179/100.2

3,471,654 10/1969 Dollenmayer.................... 179/100.2

*Primary Examiner*—Vincent P. Canney

*Attorney, Agent, or Firm*—John J. Dennemeyer

[57] ABSTRACT

Device for positioning movable reader stations relative to the track of sheet-like records carriers, in which a carrier is brought into a fixed position, track setting slides being provided which are movable between a retracted and a projecting position. In the projecting position the slide indicates a chosen track to be read on the carrier. The reader station moves along a path until it contacts the slide, the reader station being then in the position to read the chosen track.

12 Claims, 21 Drawing Figures

PATENTED MAR 12 1974 3,797,034

SHEET 07 OF 10

DEVICE FOR SETTING THE TRACK OF RECORDS

The invention relates to a device for positioning movable reader stations relative to the track of sheet-like records carriers.

Prior art devices of this type must be adjusted to close tolerances so that they function correctly, they are expensive and have unfavorable acceleration conditions, other than in that the reader stations, writer stations or similar work stations must be accelerated and slowed down. In fact the setting device must be also accelerated and slowed down in the same manner.

It is an object of the invention to provide a device of the above mentioned type which is free of close tolerances, inexpensive, has pivotable positive and negative acceleration properties and which affords the possibility of effecting an exact setting over comparatively large distances, e.g., with a distance of 20 cm, many tracks, for example a 100 tracks.

According to the invention this object is attained by providing track setting slides whose number and position corresponds to the number and position of the tracks, wherein the track setting slides are in their retracted position during the unaimed condition, that in each instance the aimed track setting slide may be brought into a projecting position, that parallel to the track setting slides and in their proximity a guide device is provided which guides in front of the track setting slide two carriages in a back and forth movement, that each carriage has a nose which is disposed in the path of a projecting track setting slide, that one of the carriages is rigidly connected with the reader stations, that a shears is provided whose shears halves are connected at their one end by a connecting link with a carriage each, that the pivot shaft of the shears halves is movably guided by a guiding device in the direction of movement of the carriages, that a spring is provided which pre-tensions the shears halves into their one position and that the other ends of the shears halves are maintained in a closed position by a motion device during the time period required for the work at the records carrier.

In the event that besides the reader and or eraser stations other handling stations must be established they are to be coupled to and moved in the usual manner with the reader station. These stations may operate magnetically, electrically, optically, by compressed air or in any other suitable manner.

Further advantages or features of the invention may be taken from the following description of a preferred embodiment. In the drawings.

Figure 4:
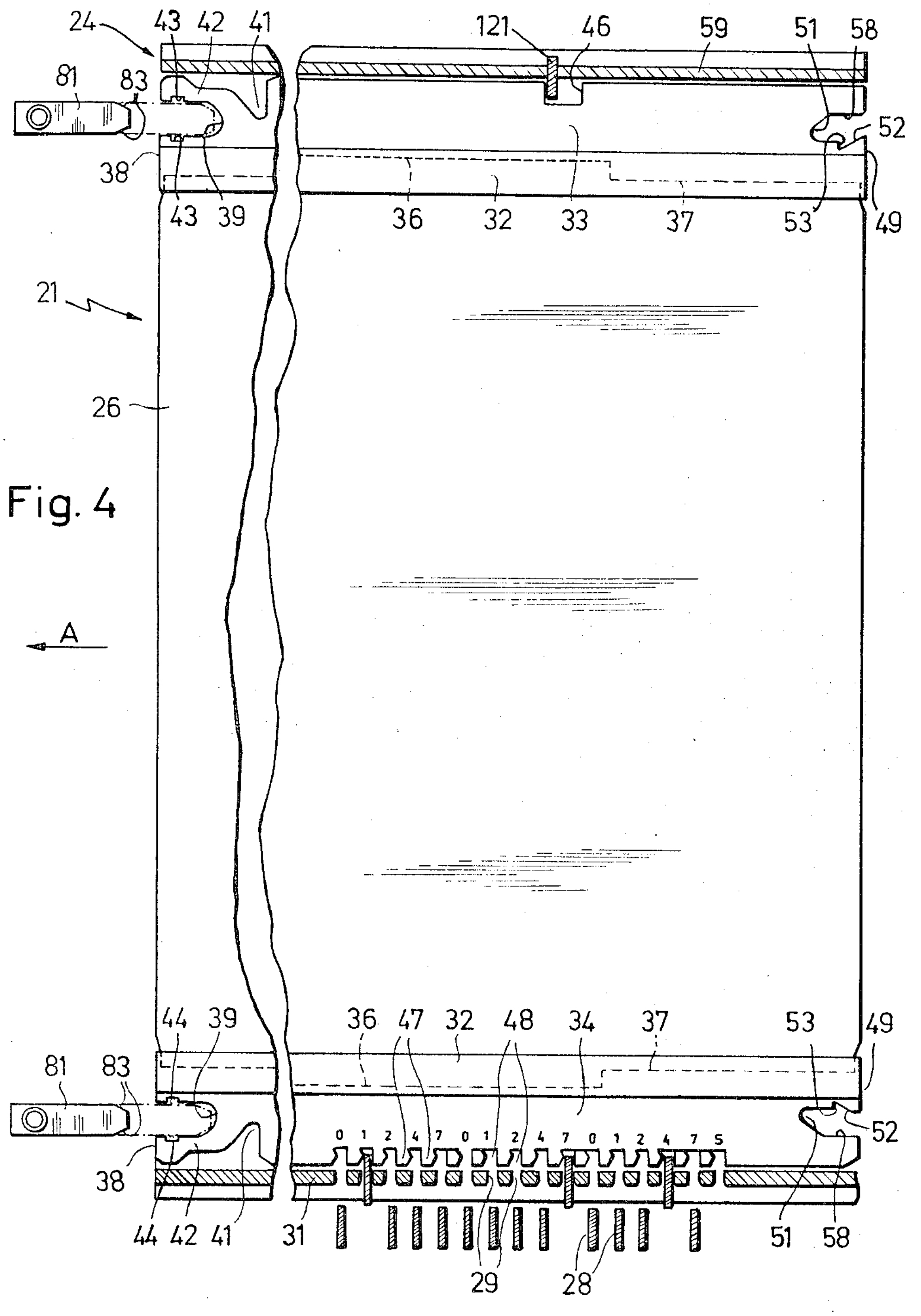
Figure 5:
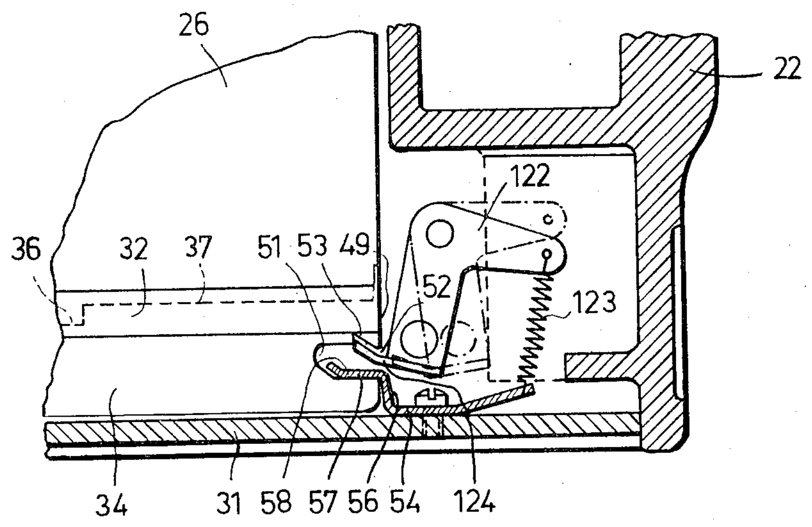
Figure 6:
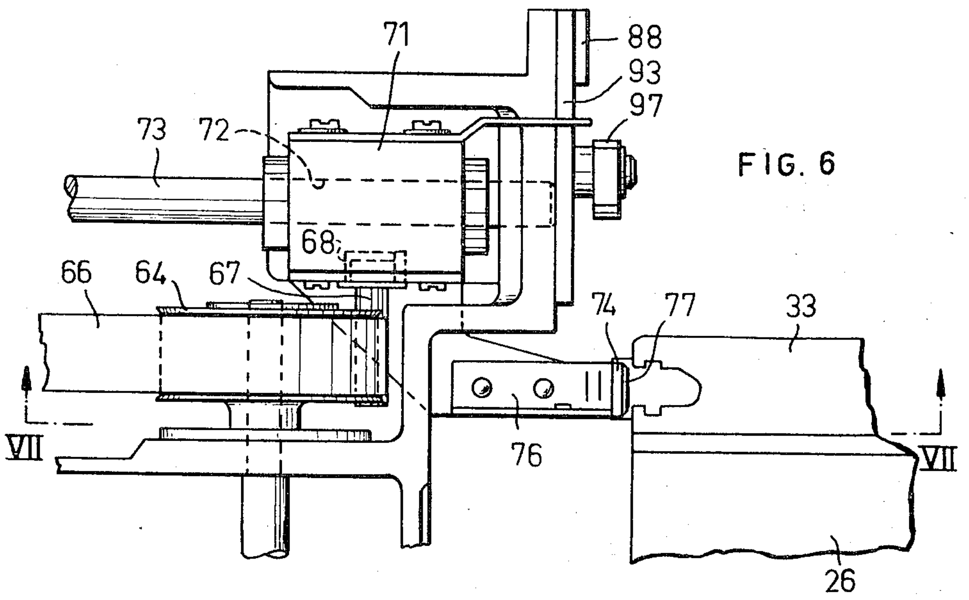
Figure 7:
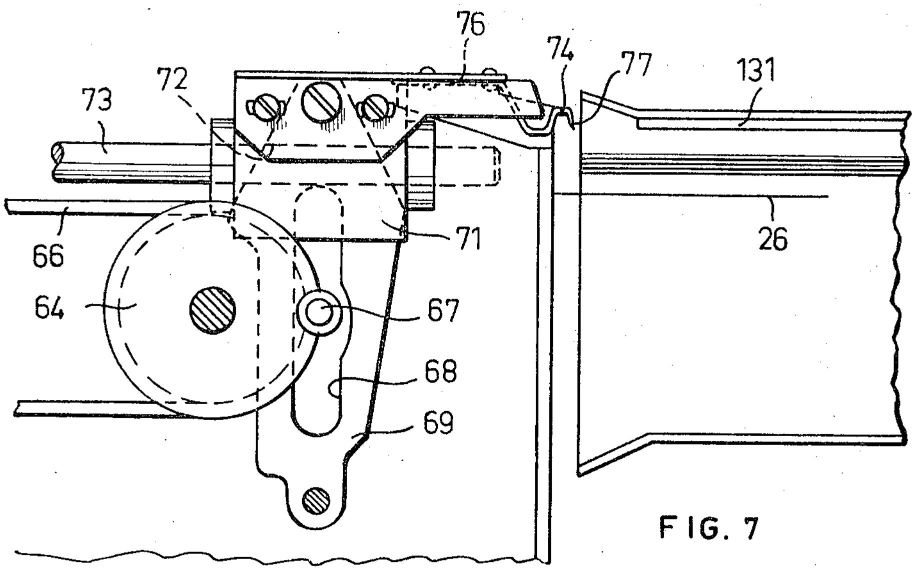
Figure 8:
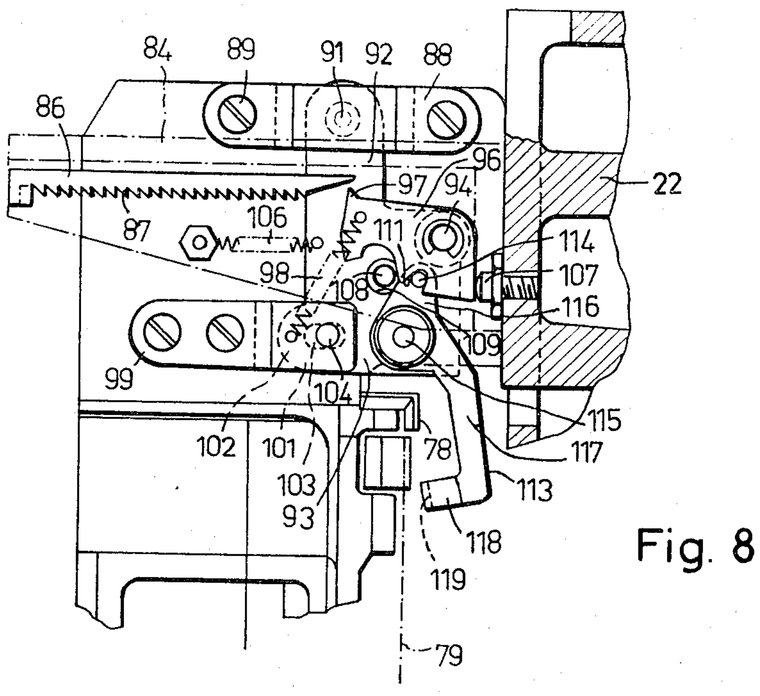
Figure 9:
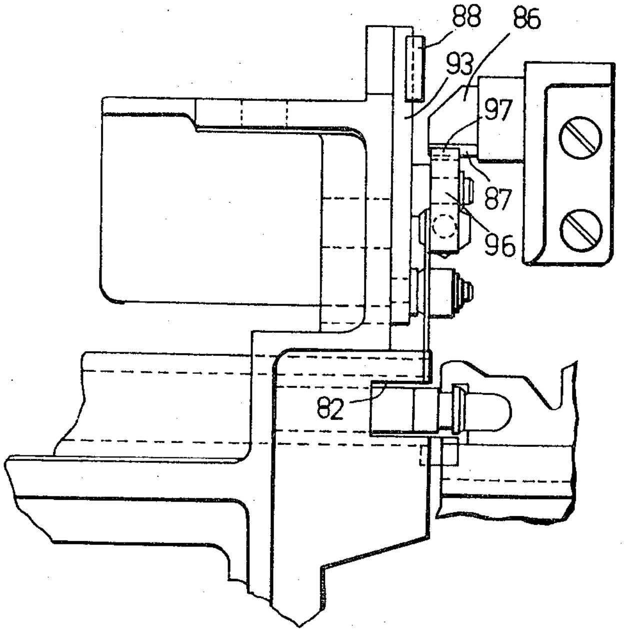
Figure 10:
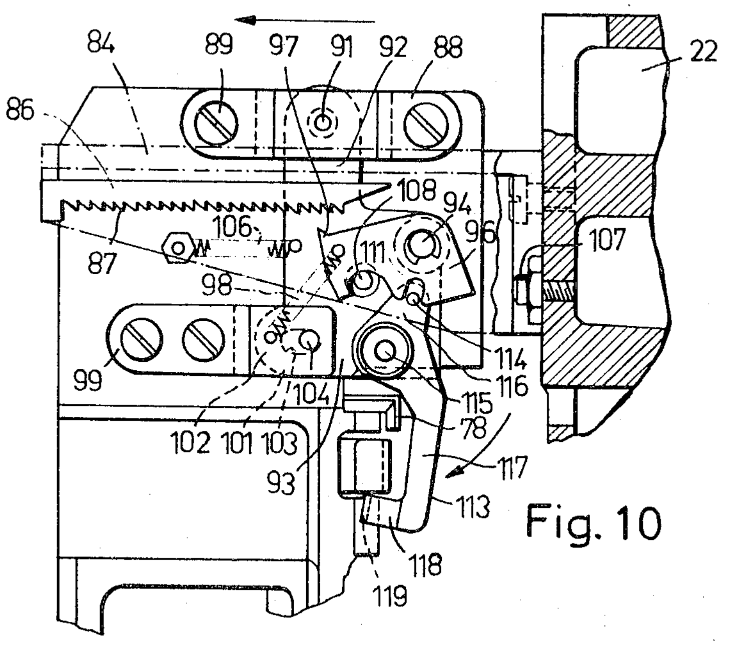
Figure 11:
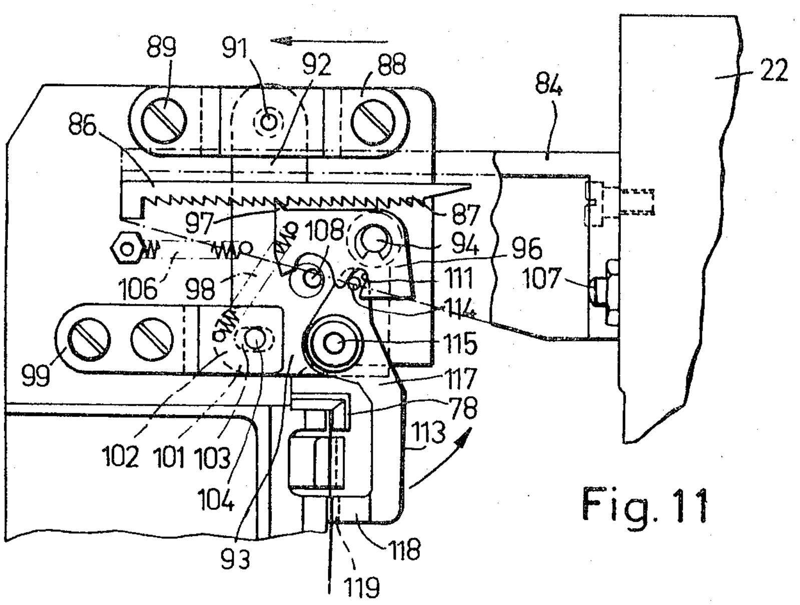
Figure 12:
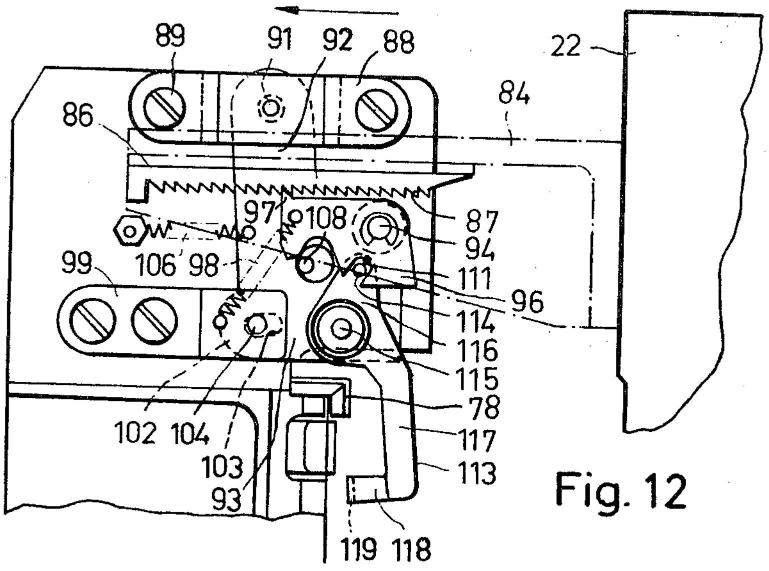
Figure 13:
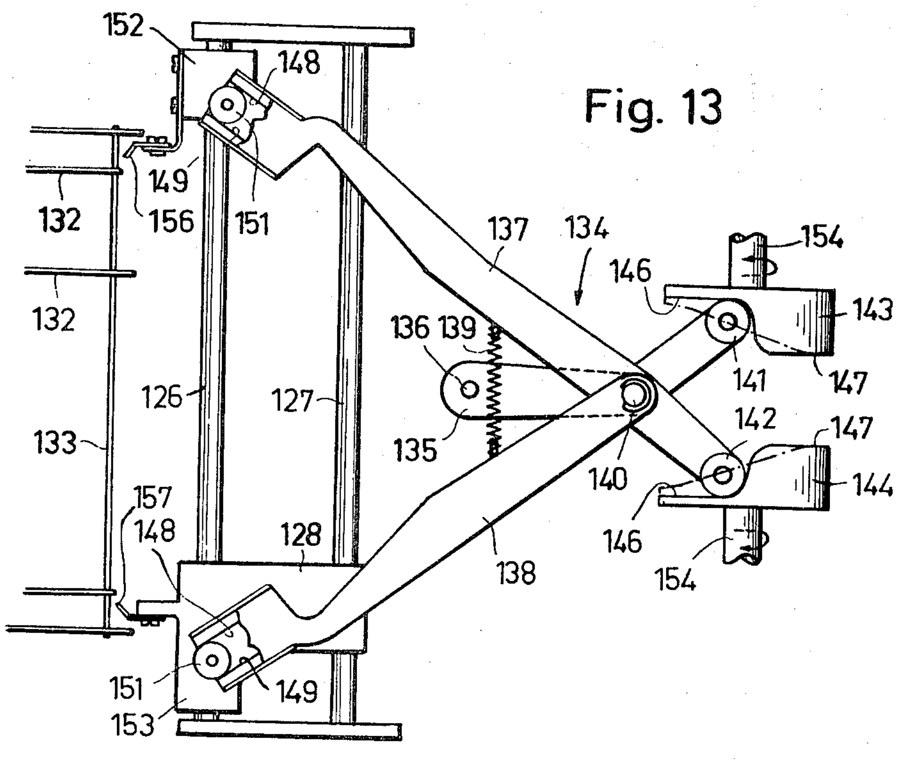
Figure 14:
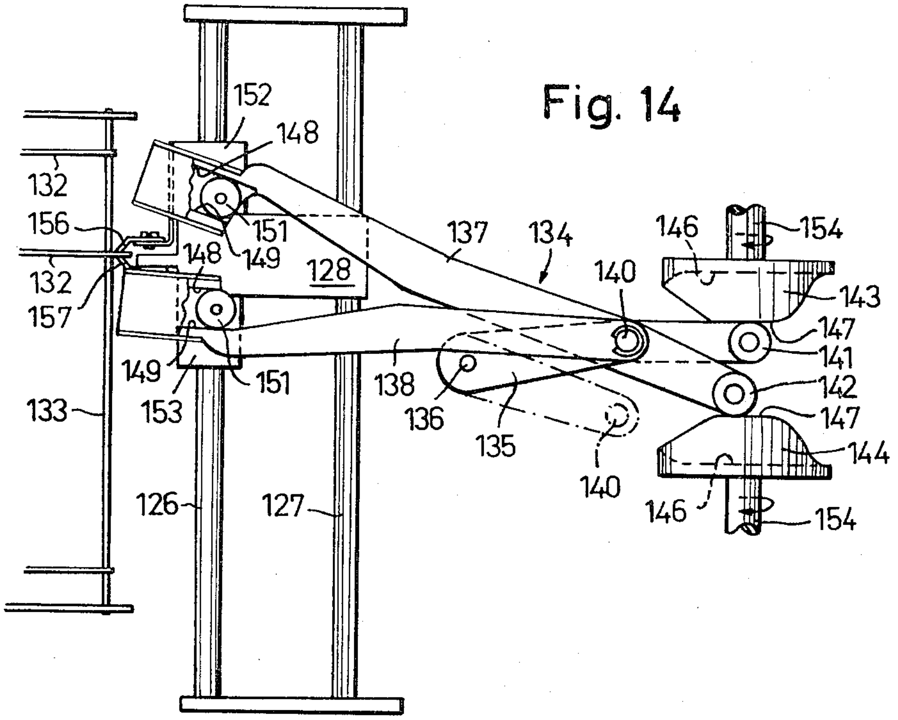
Figure 15:
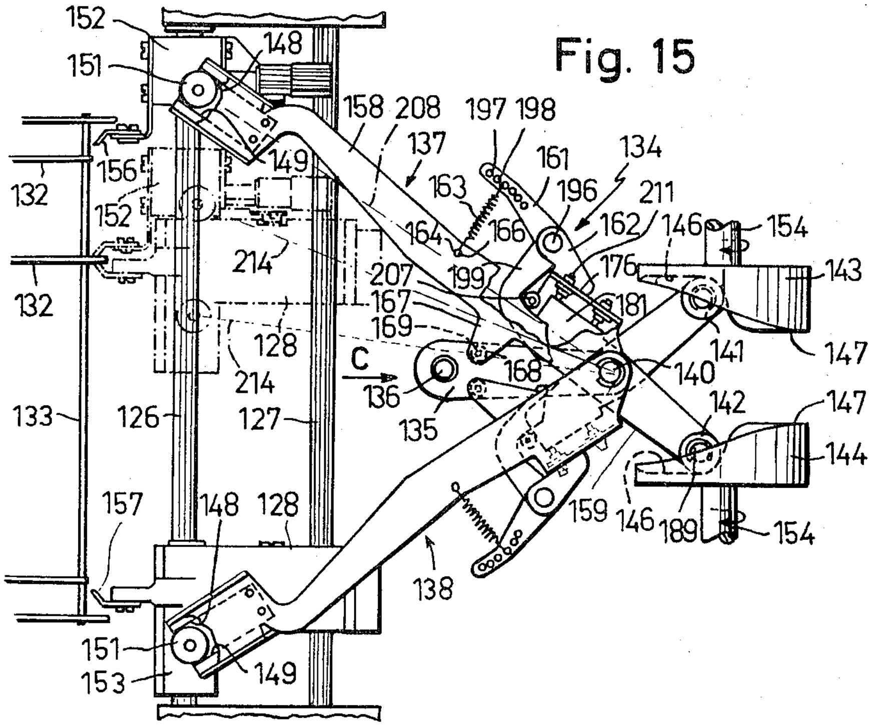
Figures 16, 17:
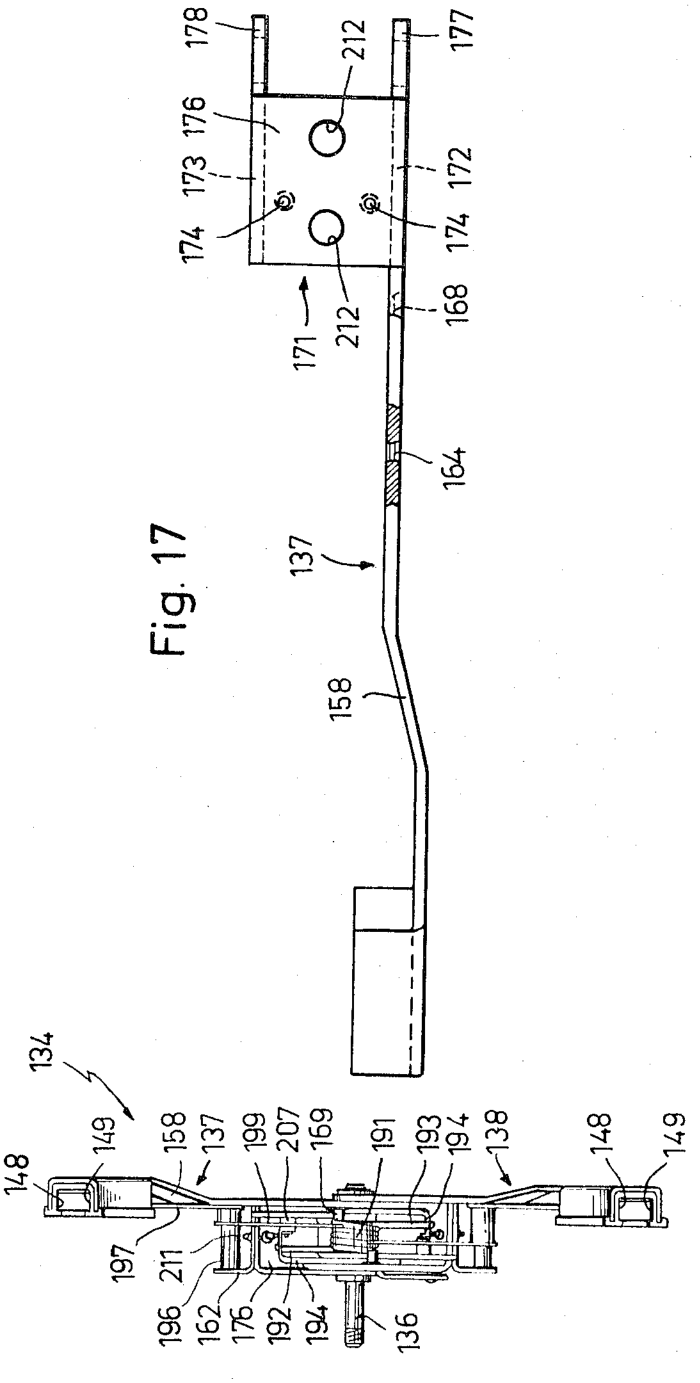
Figure 18:
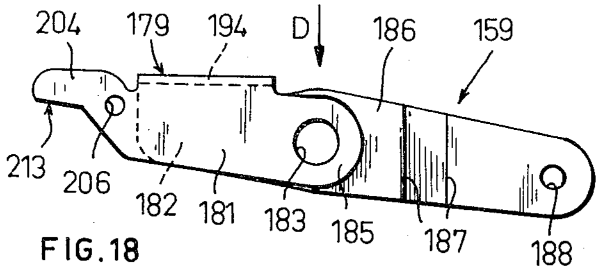
Figure 19:
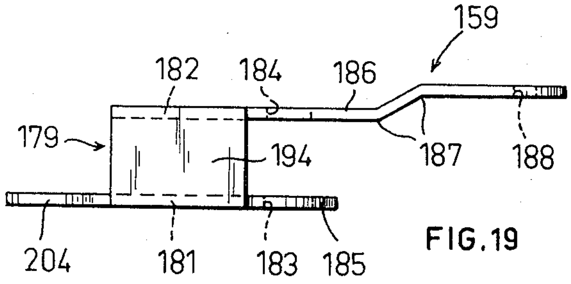
Figure 20:
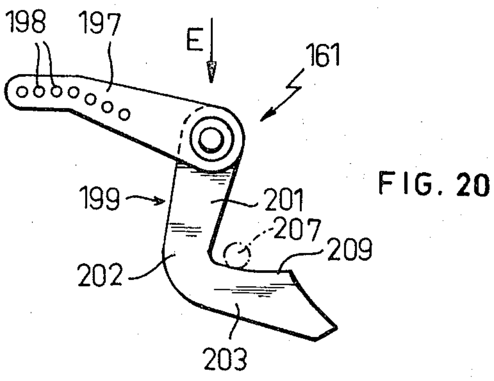
Figure 21:
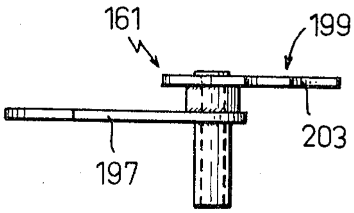

FIG. 4 is a simplified section through the cassette with pull-out rods and selector device, FIG. 5 is an exact vertical section through the right lower corner of the cassette, FIG. 6 is a front view of the upper transport hook drive with part of a magnetic sheet, FIG. 7 is a section along line VII—VII in FIG. 6, FIG. 8 is a face view of the upper range of the pivot frame in the first work position, FIG. 9 is a side view of the device shown in FIG. 8, FIG. 10, 11 and 12 are views similar to FIG. 8 showing additional work positions, FIG. 13 is a diagrammatic rear view of the base frame in the range of the shears with a diagrammatic illustration of the shears in a first work position, FIG. 14 is an illustration as in FIG. 13 showing a second work position of the shears, FIG. 15 is an exact illustration of the parts cooperating with the shears in two different work positions, FIG. 16 is a view only of the shears in the direction of arrow C of FIG. 13, FIG. 17 is a plan view of the upper unmounted shears arm, FIG. 18 is a front view of the upper curve sensor lever, FIG. 19 is a view along arrow D in FIG. 18, FIG. 20 is a front view of the upper catch lever, FIG. 21 is a view along arrow E in FIG. 20.

A storage apparatus 21 comprises generally a base frame 22, a pivot frame 23 and an exchangeable cassette 24. For the cassette 24 tracks and support elements not shown in the drawing are provided in the base frame 22 so that cassettes may be inserted in the direction of the arrow A. In cassette 24 a stack of one hundred magnetic sheets are supported in a vertical position. An individual magnetic sheet 26 may be selected from among the 100 magnetic sheets and moved out in the direction of arrow A (FIG. 4) a distance of 5 mm so that it projects with respect to the other magnetic sheets. Thereafter the pivot frame 23 may be pivoted in the manner indicated in broken lines in FIG. 1 until it has a predetermined position relative to the selected magnetic sheet 26. Thereafter a specific device grasps the magnetic sheet, pulls it completely out of the magnetic cassette 24, and transports it in a vertical position towards the left. Thereafter the pivot frame 23 pivots back into its position indicated in full lines, and transports the magnetic sheets 26 back into the cassette 24. During this operation the magnetic sheet 26 is read, inscribed or otherwise treated.

In the lower portion 27 of the base frame 22 codinb slides 28 are provided which are movable upwardly. Above the coding slides 28 correspondingly exactly aligned slots 29 are provided in the bottom 31 and on the side walls of the cassette 24 so that the coding slides 28 may penetrate deeply into cassette 24, as far as they have been urged to move upwardly by a directing device not shown in the drawing.

FIG. 4 shows some of the coding slides 28 in their upper position and some in their lower position.

Each magnetic sheet 26 consists of a sheet of synthetic material having a thickness of about 0.15 mm, a length of about 21 cm and a height of about 18 cm. By means of an adhesive strip 32 an upper rider 33 and a lower rider 34 is attached to the sheet 26. The riders are made of spring steel and have on their mutually facing edge an indentation 36 receiving a projection 37 of complementary shape with an exact fit so that the riders 33, 34 and the magnetic sheet 26 are connected to each other in a horizontal direction also in a form fitting manner. Both riders 33, 34 have on their front face side 38 seen in the pull-out direction (arrow A) an indented recess 39 and in their outer face edges a notch 41, so that a spring finger 42 is produced which yields outwardly upon the expansion of the recess 39. Each recess 39 presents at the top and bottom two rectangular hook recesses 43 which are aligned in a vertical direction. It would be basically possible to provide the hook recesses 43 separately from the recess 39. However, by combining them they can be punched with a single tool. At its upper edge the rider 33 presents additionally a pullout stop recess 46. The lower rider 34 has teeth 47 at regular intervals and therebetween spaces 48 which correspond in their width to the thickness of the coding slides 28 and which are aligned with the slots 29. The slots 29 provide, due to their being directed downwardly, that no foreign elements can penetrate into the cassette 24.

On their rear ends 49 the riders 33, 34 each has an indentation 51 which presents in the pull-out direction and in the direction facing the magnetic sheet 26 a first saw tooth section 52 followed by sharply dropping saw tooth section 53.

The magnetic sheets 26 are maintained level in spite of their sheet-like behavior by means of a device which is very simple but which fulfills its purpose completely. According to FIG. 5 an angle iron 54 is screwed at the lower rear portion of the cassette to its bottom 31 and its vertical portion 56 is aligned with the rear end 49 of the rider 34 and its horizontal portion 57 bears against the horizontal lower part 58 of the indentation 51.

The angle iron 54 extends transversely through the cassette 24 and transversely through all indentations 51.

An exactly identical angle iron is screwed inside at the top 59 of the cassette 24 and projects in a corresponding manner into the upper indentation 51. This mounting is completely adequate to maintain the magnetic sheets 26 in the unit. In this arrangement the upper angle iron supports the magnetic sheets 26 and the riders 33, 34. Accordingly a force is exerted on this portion of the angle iron which is directed downwardly. On the other hand the lower angle iron 54 is loaded essentially only with its portion 56 and takes up the horizontal reaction force directed toward the left. Due to the light bending at portion 57 and due to the form of the lower side 58 or the corresponding side of the upper indentation 51 the riders 33, 34 find their way easily into the angle irons 54.

Figure 1:
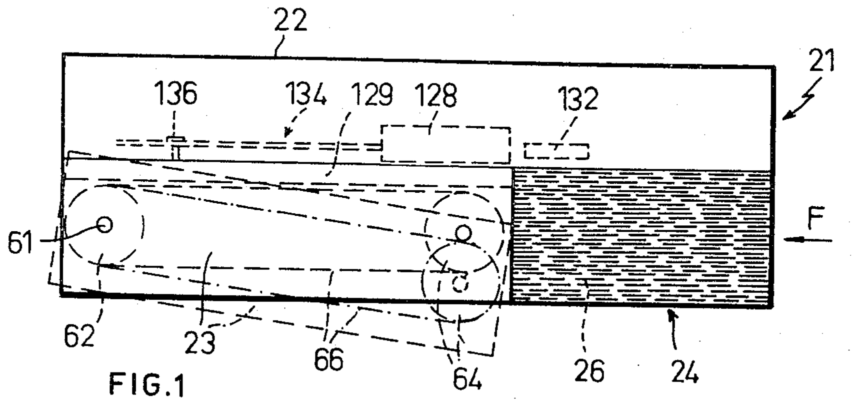
FIG. 1 is a substantially diagrammatic plan view of the storage apparatus.
Figure 2:
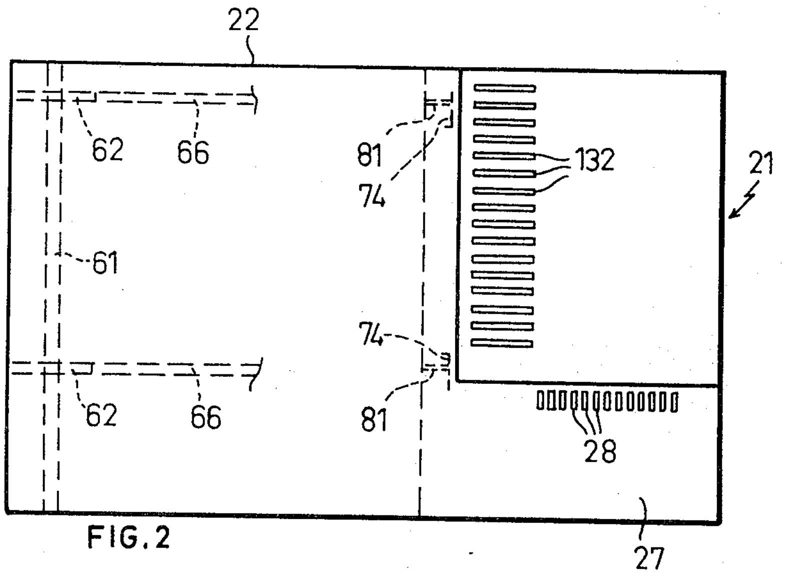
FIG. 2 is a front view of FIG. 1.

The pivot frame 23 is pivotable by a maximum of 8% from its position shown in full lines in FIG. 1 into the position indicated in broken lines around a vertical shaft 61 which is journalled at the top and bottom to the base frame 22. Due to this basic arrangement no substantially more expensive guides are required which would be necessary if it were desired to slide the pivot frame 23 parallel to itself. Furthermore the forces to be generated for a pivot movement are much smaller than those for a sliding movement parallel to itself because only the side of the pivot frame 23 located adjacent the cassette 24 needs to travel the maximum distance. On shaft 61 two gears 62 FIG. 2) are provided which may be driven from the base frame 22 according to FIG. 1 either in the clockwise direction or in the counter clockwise direction and are aligned approximately at the level of the slots 39 of the riders 33, 34. As the shaft 61 and the gears 62 do not change their position relative to the base frame 22 during their pivotal movement, the gears 62 may be driven in a simple manner independently of the location of pivot frame 23. Near to the right side of the pivot frame 23 as seen in FIG. 1 a further vertical shaft 63 is provided which carries at the upper and lower end gears 64 which are not driven and which are aligned at the level of the gears 62. The upper gear 64 is clearly illustrated in FIGS. 6 and 7.

The gears 64 are not driven. Between the upper gears 62, 64 and the lower gears 62, 64 a gear belt 66 is stretched between each pair. Each of these gear belts carries a follower pin 67 directed vertically upwardly or downwardly. This pin extends into a longitudinal opening 68 of a follower plate 69 disposed vertically to the direction of movement of sheets 26. The follower plate is rigidly connected to a guide piece 71 which has a circularly cylindrical longitudinal bore 72. Which slides on a circularly cylindrical guide rod 73 which extends alongside the pivot frame 23 on a side of the base frame and horizontally parallel to the gear belt 66. The transport hook 74 is rigidly connected to the guide piece 71 and is mounted on an arm 76 extending downwardly from the guide piece 71. The hook point 77 may penetrate into the hook recesses 43, 44 of the riders 33, 34 when a predetermined sheet 26 has been extracted by 5 mm from the magnetic sheet unit and the pivot arm 23 has been pivoted to position hook 74 in alignment with the extracted magnetic sheet. From FIG. 2 it may be seen that transport hooks 74 are provided at the top and bottom, and a transport hook 74 is associated with each endless gear belt 66. As may be seen from FIG. 7 the hook 77 points into the direction of the upward pivoting of the pivot frame 23. The illustrated arrangement is very simple. As may be seen from FIG. 7 the follower pin 67 is shown located in its rest position. If it moves in a counterclockwise direction the transport hook 74 is not accelerated immediately at the full speed of the gear belt drive. Instead a gentle acceleration takes place so that only after a quarter revolution of the gears 64 does the magnetic sheet 26 reach its full speed. U-shaped rails 78 are provided above and below the riders 33 and 34 in the pivot frame 23. The upper U-shaped rail which is shown in FIG. 8 is open at the bottom while the lower corresponding U-shaped rail is open at the top. Between them they define a transport track 79 which is shown in FIG. 8 and which is positioned vertically and is parallel to the travel of the transport hooks 74.

Figure 3:
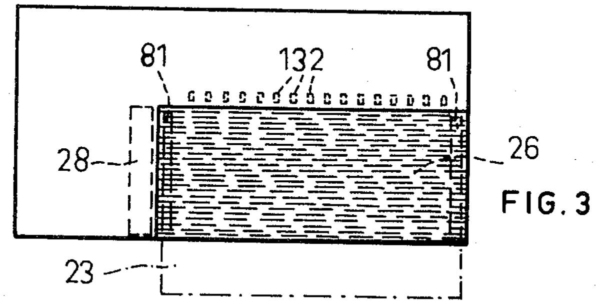
FIG. 3 is an end view as seen along arrow F in FIG. 1.

In the front side of the pivot frame 23, at the top and bottom thereof, are mounted two pull-out rods 81. These rods are guided in horizontal guides 82 (FIG. 9) but are shown for the purpose of clarity in the drawings only in FIGS. 2, 3 and 4. The pull-out rods 81 are slightly but specifically thicker than the indented recesses 39 of the riders 33, 34 are wide. In order that the pull-out rods 81 find their way into the recesses 39 they are provided at their front ends with two symmetrical chamfered edges 83. Their rest position is shown in full lines in FIG. 4 while their advanced position is illustrated in a dash and dot line.

Racks 86 are mounted adjacent the moveable end of the pivot frame 23 on the base frame 22 by means of angle irons 84 (FIG. 8) – (FIG. 12) wherein the saw teeth 87 of the upper rack are directed downwardly and the saw teeth of the not illustrated lower rack point upwardly. The racks 86 extend horizontally. The following description is directed only to one functional unit as the other functional unit which is arranged at the lower part is correspondingly symmetrical.

A bearing plate 88 in the form of a U-shaped angle iron is attached by means of screws 89 to the pivot frame 23. It holds a shaft 91 on which an upwardly directed tab 92 of a bearing plate 93 is arranged above the U-shaped rail 78. For the shape of the bearing plate reference is made to FIGS. 8 to 12. In the right upper corner of the bearing plate 93 a bolt 94 is located on which a stop plate 96 is pivotally mounted. It is adapted to engage its left upper tooth 97 with the saw teeth 87. A tension spring 98 is attached below the tooth 97 and pulls downwardly and to the left while its other end is fixed to a limit plate 99 which is screw-fastened to the pivot frame 23. An eye 102 of the bearing plate 93 and shown in broken line has a horizontal longitudinal opening 103 and is located below an outwardly bent tab 101 of the limit plate 99. A pin 104 extends into this longitudinal opening and is rigidly connected to the tab 101. By means of a tension spring 106 a torque is exerted on the bearing plate 93 in the clockwise direction around the shaft 91. In its position shown in FIG. 8 the stop latch 96 has been swiveled clockwise by an abutment screw 107 fixed to the base frame and against the force of the tension spring 98. In the counterclockwise direction the stop latch 96 can move as far as an abutment pin 108 which is rigidly connected with the end of the pivot frame 23 and traverses the bearing plate 93 in a bore 109 which has an appropriate size such that the abutment pin 108 does not abut in the bore 109 in the two extreme positions of the bearing plate 93 but merely serves as abutment for the stop latch 96.

From the lower left obliquely to the upper right portion of 96 extends an indentation 111 which encloses in a form fitting manner a follower pin 114 of a sensor latch 113. This latch is mounted by a stud 115 on the bearing plate 93 above its lower edge. Its extension 116 projecting upwardly and to the right carries the stud 114. Its leg 117 extending downwardly is bent at right angle at its lower end and is formed there into a foot 118 which carries a sensor plate 119 at its front end. The shape is so designed that during pivot movements of the sensor latch 113 the sensor plate 119 can lie below the transport hook 74 and can abut an extracted magnetic sheet 26 against its upper rider 33, but touches no other parts.

In the following description it will be explained how the pull-out transporting action of the magnetic sheet is carried out: A magnetic sheet of code number 174, for example is to be handled. on only this magnetic sheet the teeth 47 corresponding to the position values 1, 7 and 4 are broken off. The data handling machine to which the storage apparatus 21 is connected directs in a known manner the coding slides 28 (FIG. 4) into the space 1 of the unit place (left), the space 7 of the decade place (centre), and the space 4 of the hundreds place (right). The pull-out stop 121 is guided from the base frame through the top 59 of the cassette 24 into the pull-out stop recess and furthermore the upper and lower arresting guards are guided on the base frame from the position shown in full lines in FIG. 5 against the force of the tension spring 123 into the dot and dash line position. In this way the straight edge 124 fixed to the guard is withdrawn from all saw tooth sections 52 of all riders 33, 34. Now the upper and lower pull-out rod 81 are inserted uniformly into all indented recesses 39, and the recesses expand. Thereafter the pull-out rods 81 move again to the left but can frictionally pull only the sheet "174" because all others are held by elements 28. After a pull-out travel of 5 mm the pull-out stop 46 abuts with its rear edge against the pull-out stop slide 121, the magnetic sheet 26 remains in place, the pull-out rods 81 move further back into their starting position and slide out of their indented recess 39. Simultaneously the straight edges 124 have moved inwardly along the saw tooth sections 52. Assuming that during this operation the pull-out rods 81 had lost the magnetic sheet 26, e.g. because the friction between the indented recess 39 and the rods was not sufficiently large then the straight edges 124 would have struck during the inward movement against the vertical saw tooth section 53 of the magnetic sheet 26 remained in place and would have brought the sheet completely into the position shown in dot and dash lines. The arresting guards 122 thus not only hold the magnetic sheet 26 in the unit so that they do not drop out of the front from the cassette when it is moved, for example to be transported. The arresting guards 122 with their straight edges 124 have rather the effect that within the time interval provided for this purpose the selected magnetic sheet 26 is moved from into the position shown in dash and dot lines. The interval of the saw tooth section 53from the face side 49 measured in a vertical direction is equal to the pull-out travel of 5 mm. At the end of the selection process all the coding slides 28 and the pull-out stop slide 21 are out of engagement with the riders 33, 34.

Seen from the front side, as in FIG. 4, the hook point 77 is aligned with the hook recess 43, 44 but is not yet in engagement. In order to obtain this the base frame 22 pivots the pivot frame 23 in the clockwise direction as shown in FIG. 1. Now the abutment screw 107 no longer abuts against the stop slide 96, the tension spring 98 pivots the slide 96 stop latch 113 and engages the stop 114 and swings 113 to the position shown in FIG. 10. The sensor plate 119 is thus positioned in front of the transporting track 79. In the course of the pivot movement the sensor plate 119 engages the selected magnetic sheet 26, or more exactly its upper rider 33. As can be seen from the drawings the lever arm between the sensor plate 119 and the pivot 115 is about four times as large as the interval between the pivot 115 and the stud 114. The rider 34 is therefore used to only a small degree and it projects only a few millimeters from the unit of the other magnetic sheets. The stop latch 96 is moved against the force of the sensor spring 98 in a clockwise direction by 113 and its tooth 97 engages one of the saw teeth 87 of the rack 86. In this manner the stopping process is initiated. The pivot frame 23 may move yet a small distance outwardly and in fact until the limit pin 104 has abutted to the left in the longitudinal opening 103 as shown in FIG. 12. Thus also the bearing plate 93 is pivoted a small distance around its shaft 91 in a counterclockwise direction. In this manner the sensor plate 119 comes out of engagement with the rider 33 and rubs no more therealong (FIG. 12) when the magnetic sheet 26 is now pulled into the pivot frame 23. The hook point 77 has now penetrated into the hook recesses 43, 44 and the tooth belts 66 are set into motion. Thereby the transport hooks 74 move according to FIGS. 1, 2, 6 and 7 to the left and pull in the magnetic sheet 26 on the transport track 79. When the magnetic sheet 26 is pulled in completely, the pivot frame 23 is pivoted back. The magnetic heads 128 which are moved up and down on the vertical guide rods 126 and 127 are now brought to a level which corresponds to the track of the magnetic sheet 26 to be read. Thereupon the tooth belts 66 are moved in the reversed direction. Now the transport hooks 74 push the magnetic sheet 26 past the magnetic heads 128 and into the cassette 24. The pivot frame 23, between and adjacent the magnetic heads, is provided with four webs 129 so that the magnetic sheets 26 have always a predetermined support surface on their back side. The magnetic sheets 26 may thus be withdrawn selectively from the cassette 24. During the return transporting they are always deposited in the inner area of cassette 24, as shown in FIG. 1. In the cassette 24 at whose rear wall pressure straps 131 are provided which are illustrated diagrammatically in FIG. 7. These straps push the deposited magnetic sheet 26 forwardly and thus slide it off the hook point 77. THe deposited magnetic sheet 26 is fully moved into the magazine only when during a following selection process the pull-out rods 81 are moved forward again. This process serves also to straighten out the magnetic sheets 26 in a straight line.

In the base frame 22 track setting slides 132 are provided which are disposed above one another and which may be aimed by the control unit of the data handling apparatus similar to the coding slides 28. In the unaimed state the track setting slides 132 are all in their retracted position while the aimed track setting slide projects. Horizontal slits in the front wall 132 of a slide box fixed to the frame is used to guide the forward area. Because of its particular level a track setting slide 132 indicates which track of the magnetic sheet 26 should be worked.

In order to bring the magnetic heads 128 to the right level and holding them there a shears 134 is provided which is illustrated in FIG. 13. A bolt 136 is rigidly fixed horizontally on the base frame 22. At its free end it carries pivotably a pivotable joint bar 135 directed to the right as seen in FIG. 13. This joint bar carries at its right end a horizontal bolt 140 which constitutes the crossing point of two shears halves 137, 138. A spring 139 presses the shear halves 137, 138 apart as far as this is permitted by two rollers 141, 142 which travel on track curves 143, 144. These track curves 143, 144 are symmetrical to a plane extending horizontally through the bolt 136 and has areas 146 located at a greater distance from each other and areas 147 located at a lesser distance from each other. In the position shown in FIG. 13 the shears is therefore opened completely and symmetrical to this plane. This is the starting position of the shears 134. At the left extremities of the shears halves 137, 138 guide surfaces 148, 149 which are parallel to each other are provided which enclose rollers 151 mounted rotatably on guide blocks 152, 153. The guide blocks 152, 153 are mounted on the guide rods 126, 127 so as to be movable up and down parallel to each other. The lower guide block 153 carries also the magnetic heads 128.

The track curves 143, 144 are rigidly connected to a vertical shaft 154 which is rotatably mounted in the base frame 22. When the rollers 141, 142 are located in the areas 146 which are at a substantial distance from each other the shears is fully open according to as shown in FIG. 13. When the shaft 154 rotates the rollers 141, 142 approach each other due to the areas 147 that are more proximate to each other, the force of spring 139 is overcome and the shears 134 closes. Assuming now that according to FIGS. 13 and 14 one of the upper track setting slides 132 projects from the front wall 133. On closing of the shears the nose 156 of the upper guide block 152 coming down from above strikes first against the track setting slide 132. Now the guide block 152 cannot move any further downward. The shaft 154 continues rotating nevertheless and keeps closing the shears more and more. Because of the joint bar 135 and the lower shears half 138 can now be lifted beyond the center point until the nose 157 of the guide block 153 strikes from below against track setting slide 132. This condition is indicated in FIG. 14. During this procedure the joint bar 135 has pivoted from its FIG. 13 position to the FIG. 14 position. If a track setting slide 132 had to be sensed further down the nose 157 would have first struck and the procedure just described would have taken place toward the other side. The joint bar 135 would have been pivoted in that case into the position shown in broken lines in FIG. 14. This manner of track setting works very rapidly because after a half revolution of the shaft 154 the track is set. By means of a sliding transition between the areas 146 and 147 the shears halves 137, 138 may be optimally accelerated. Independently of the position of the track setting slides 132 one has a constant setting time. Tolerances of the structural parts have no substantial influence as the only decisive factor is that the track setting slide 132 has the correct height position and the shears 132 may be able to close. Instead of a guiding by means of a joint bar 135 one could also select a more complicated guiding of the bolt 140 through a vertical straight line guiding similar to that of the guide blocks 152, 153. Instead of pressing the right ends of the shears halves 137, 138 against each other by means of the track curves 143, 144 one could also press them against each other e.g. by means of magnets. The basic structure described above has the advantage that it is very simple and may be adapted exactly into the working cycle. As in all other structural parts of the storage apparatus the movement of the shaft 154 may be obtained easily by means of guide curves of the conventional type.

It could happen that due to some error two track setting slides 132 project from the front wall 133. For this reason it is necessary to provide a device which permits that one or both shears halves 137, 138 can yield so that the two track curves 143, 144 can close the shears 144 merely up to the two track setting slides 132. In order to facilitate the yielding without creating difficulties the construction shown in FIG. 15 is provided which is explained on the basis of the upper shears half 137. It comprises a shears arm 158, a curve sensor lever 159, a locking latch 161, a bearing angle piece 162 and a tension spring 163. At the top of the shears arm 158 the two guide surfaces 148, 149 are provided. A stop 166 FIG. 15 riveted into a bore 164 and one end of the tension spring 163 is attached to this stud. A stud 169 is riveted to a projection 167 directed downwardly and the stud is located in a bore 168 and directed inwardly toward 135. The inner end of the shears arm 158 is designed in the form of a bridge 171 (FIG. 17) which has two cheeks 172, 173. The bearing angle piece 162 is screwed in two bores 174 and sits on the cross piece 176 of the bridge 171. At the back side the bridge 171 defines two parallel eyes 177, 178 which are traversed by bolt 140.

The curve sensor lever 159 has also a bridge 179 with two cheeks 181, 182 which are disposed vertically thereto. This bridge 179 fits under bridge 171. The cheek 181 defines an eye 185 whose bore 183 is aligned with a bore 184 of the tail 186 directed towards the right. After a double bend 187 the tail 186 presents a cross bore 188 in which a bolt 189 is riveted which carries the roll 142 axially non-slidably. The bore 183, 184 is traversed by bolt 140 thich traverses also the eye 177, 178 of the shears arm 158. A spiral spring 191 (FIG. 16) is wound around bolt 140 as replacement of spring 139 and its ends 192, 193 lie against the underside of the cross-piece 194 of the bridge 179 and urge the shears 134 to open. The stop latch 161 is mounted on the cross shaft 196 of the bearing angle piece 162 and the particular shape of the stop latch 161 can be seen readily in FIGS. 20 and 21. With regard to the shape of the other parts of the shears 134 particular reference is made to FIGS. 15-21 which are illustrated true to scale.

The bearing angle piece 162 is a double armed lever whose one lever 197 extends approximately parallel to shears arm 158 and has several bores 198, and in one of which the tension spring 163 is attached. Therefore the bearing angle 162 is pretensioned in the counter clockwise direction.

The other lever 199 has a leg 201 which is disposed vertically relative to lever 197 which bends down vertically over a knee 202 and forms a second leg 203.

The cheeck 181 of the curve sensor lever 159 continues to the left and forms a beak 204 in whose bore 206 a rearwardly extending bolt 207 is riveted. This arrangement is so designed that the bolt 207 is displaced slightly to the right relative to the vertical which can be established on the geometrical longitudinal axis 208 of the shears and bears against the upper face surface 209 of the leg 203. This face surface 209 is curved slightly toward the geometrical longitudinal axis 208. For the exact setting of this configuration two setting screws 211 are provided which are lodged in bores 212 of the cross-piece 176 of the shears arm 158. They press with their lower surface against the upper side of the cross piece 194 of the curved sensor lever 159.

This device constitutes a yieldable overload device which maintains the shears arm 158 and the curve sensor lever 159 in a relatively rigid configuration relative to the geometrical longitudinal axis 208. However, when the track curve 144 pushes the curve sensor lever 159 upwardly and the shears arm 158 cannot move downwardly because it strikes too early against an inadvertently selected track setting slide 132, the roller 142 with pivot point around the bolt 140 pushes the bolt 207 downwardly. In this operation the stop latch 161 is pivoted around the cross shaft 196 slightly in the clockwise direction. THis in turn causes the face surface 192 to be positioned further obliquely to the geometrical longitudinal axis 208, i.e., that the angle enclosed with it becomes steeper. During the further procedure the bolt 207 glides then on the face surface 209 completely further down. The bolt 207 will slide fully down when the two track setting slides 132 are sufficiently far apart. In that case the underside 213 of the beak 204 bears against the stud 139. The pivot travels that have taken place up to that point are quite sufficient to make the curve sensor lever 195 travel through the path designated for it although the shears arm 158 remains in place.

The return positioning of the yielding mechanism is carried out during the subsequent opening of the shears. In FIG. 15 the shears 134 is shown in its starting position in engagement with the upper and lower guide block 152, 153. Furthermore the position of the guide block 152, 153 with the magnetic head 128 is shown in this figure in the sensing position. The geometrical longitudinal axes 214, 216 show which position the shears halves 137, 138 take up in that case.

In the event a spring 139 is provided which tends to pull the shears arms 137, 138 together supplemental track curves 143, 144 are necessary which push the rollers 141, 142 apart against the force of the spring 139.

As may be seen from FIG. 15 the noses 156, 157 are collapsed so that they can push track setting slides 132 which have remained outside into the front wall 133 while they pass by. The track setting slides 132 can deflect in this direction because they are mounted resiliently in this direction in the slide box.

We claim:

1. Device for setting the position of movable reader stations relative to the tracks of sheet-like records carriers characterized in that track setting slides are provided whose number and position corresponds to number and position of the tracks, that the track setting slides are normally in a retracted position, track setting slide being movable whereby it may be brought into a projecting position, that parallel to the track setting slides and in proximity thereof a guiding device is provided which guides two carriages in a back and forth movement in front of the track setting slide, that each carriage has a nose which is located in the path of a projecting track setting slide, that one of the carriages is rigidly connected with the reader station, that shears is provided whose shears halves are connected at their one end by a connecting link each with a carriage, that the pivot shaft of the shears halves is movably guided by a guiding device in the direction of movement of the carriages, that a spring is provided which pretensions the shears halves into their one direction and that the other end of the shears halves are maintained in the closed position by a motion device during the time period necessary for effecting the work on the records carrier.

2. Device according to claim 1, characterized in that the guiding device comprises at least one rod which extends parallel to the records carrier and is rigidly connected to the base frame.

3. Device according to claim 1 characterized in that the reader station and if desired also the writer and eraser station is provided on the lower carriage.

4. Device according to claim 1 characterized in that the connecting link comprises a roller which is enclosed by two parallel guide surfaces.

5. Device according to claim 4, characterized in that the roller is provided rotatably on carriage and that the guide surfaces are provided on the shears halves.

6. Device according to claim 1 characterized in that the guiding device comprises a tab whose one end is fixed to the base frame and mounted pivotably, and that their other end is connected pivotably with the pivot axis of the shears halves.

7. Device according to claim 6, characterized in that both pivot axes of the tab are disposed in the rest position of the shears on the central perpendicular line of the track setting slide.

8. Device according to claim 1 characterized in that the motion device comprises two track curves arranged on at least one shaft non rotatably and axially non slidably, their curve surfaces comprising areas located more remotely and more closely relative to each other, that the shaft is disposed essentially parallel to the track setting slides and that the other ends of the shears halves bear over rollers against the areas.

9. Device according to claim 8 characterized in that the areas are directed toward each other and that the spring urges the shears halves away from each other.

10. Device according to claim 1, characterized in that each shears halves comprises a yielding device allowing it to yield when a maximum permissible force is exceeded.

11. Device according to claim 10, characterized in that the yielding device comprises a shears arm and a curve sensor lever, that both are mounted pivotably at the other end of the tab, that the curve sensor lever projects substantially beyond the pivot shaft and bears at that point against the one arm of a two-arm lever which is pivotably mounted at the shears arm, that the other arm of the lever is connected to a spring which urges it into its normal position, and that the curve sensor lever lifts off the shears arm upon an excessive load and pivots the lever against the effective direction of spring.

12. Device according to claim 11, characterized in that the bearing surface of the one arm is slightly inclined towards the geometrical longitudinal axis of the shears half.

* * * * *